US010106134B2

(12) United States Patent
Trapp et al.

(10) Patent No.: US 10,106,134 B2
(45) Date of Patent: Oct. 23, 2018

(54) ERROR TRANSMISSION IN TWO-LEVEL ROTATIONAL SPEED SENSOR

(71) Applicant: Continental Teves AG & Co. oHG, Frankfurt (DE)

(72) Inventors: René Trapp, Föckelberg (DE); Jochen Zachow, Glashütten (DE); Valentina Suchanow, Böblingen (DE)

(73) Assignee: Continental Teves AG & Co. oHG, Frankfurt (DE)

(*) Notice: Subject to any disclaimer, the term of this patent is extended or adjusted under 35 U.S.C. 154(b) by 0 days.

(21) Appl. No.: 14/915,926

(22) PCT Filed: Sep. 5, 2014

(86) PCT No.: PCT/EP2014/069007
§ 371 (c)(1),
(2) Date: Mar. 2, 2016

(87) PCT Pub. No.: WO2015/032930
PCT Pub. Date: Mar. 12, 2015

(65) Prior Publication Data
US 2016/0214583 A1 Jul. 28, 2016

(30) Foreign Application Priority Data

Sep. 6, 2013 (DE) .................. 10 2013 217 883
Feb. 11, 2014 (DE) .................. 10 2014 202 473

(51) Int. Cl.
*G01P 3/44* (2006.01)
*B60T 8/171* (2006.01)
(Continued)

(52) U.S. Cl.
CPC .............. *B60T 8/171* (2013.01); *G01P 3/481* (2013.01); *G01P 21/02* (2013.01); *B60T 2270/416* (2013.01)

(58) Field of Classification Search
CPC .... B60T 8/171; B60T 2270/416; G01P 21/02; G01P 3/481
(Continued)

(56) References Cited

U.S. PATENT DOCUMENTS 6,542,847 B1 * 4/2003 Lohberg .................. G01P 3/489
324/166
7,830,278 B2 11/2010 Lohberg
(Continued)

FOREIGN PATENT DOCUMENTS

CN 103217545 A 7/2013
DE 19911774 12/1999
(Continued)

OTHER PUBLICATIONS

German Search Report for German Application No. 10 2014 202 473.0 dated Sep. 1, 2014, including partial translation.
(Continued)

*Primary Examiner* — Nadeem Odeh
(74) *Attorney, Agent, or Firm* — RatnerPrestia

(57) ABSTRACT

A method for transmitting error information in a pulse signal, the signal being designed to transmit measured values from a sensor that are frequency modulated with pulses having a first magnitude to a receiver. The method includes: recognition of an error in the sensor; and introduction of a pulse having a second magnitude which is different from the first magnitude into the pulse signal, in order to indicate the recognized error in the pulse signal.

9 Claims, 4 Drawing Sheets

(51) Int. Cl.
*G01P 3/481* (2006.01)
*G01P 21/02* (2006.01)

(58) Field of Classification Search
USPC .......................................... 701/29.7; 702/148
See application file for complete search history.

(56) References Cited

U.S. PATENT DOCUMENTS

| 9,014,921 B2 | 4/2015 | Bretzigheimer |
| 2004/0066183 A1 | 4/2004 | Lohberg |
| 2010/0090809 A1 | 4/2010 | Yeo et al. |
| 2010/0134174 A1 | 6/2010 | Trapp |

FOREIGN PATENT DOCUMENTS

| DE | 10146949 | 6/2002 |
| DE | 102007036463 | 2/2008 |
| DE | 102011080789 | 2/2012 |

OTHER PUBLICATIONS

International Search Report for International Application No. PCT/EP2014/069007 dated Jan. 8, 2015.
International Preliminary Report on Patentability and Written Opinion for International Application No. PCT/EP2014/069007, dated Mar. 8, 2016, 8 pages.
Chinese Office Action for Chinese Application No. 201480048634.2, dated Jan. 10, 2018, 6 pages.

\* cited by examiner

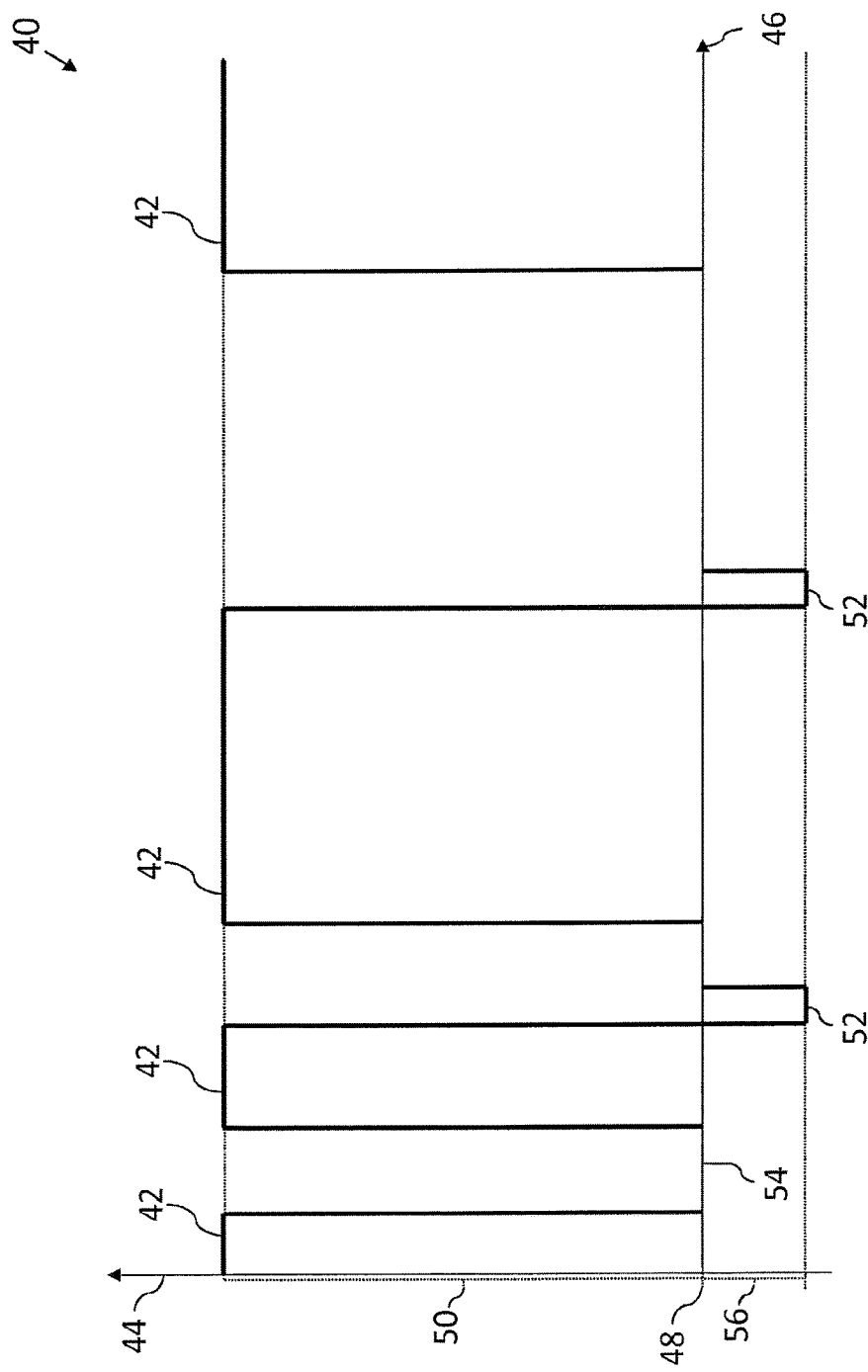

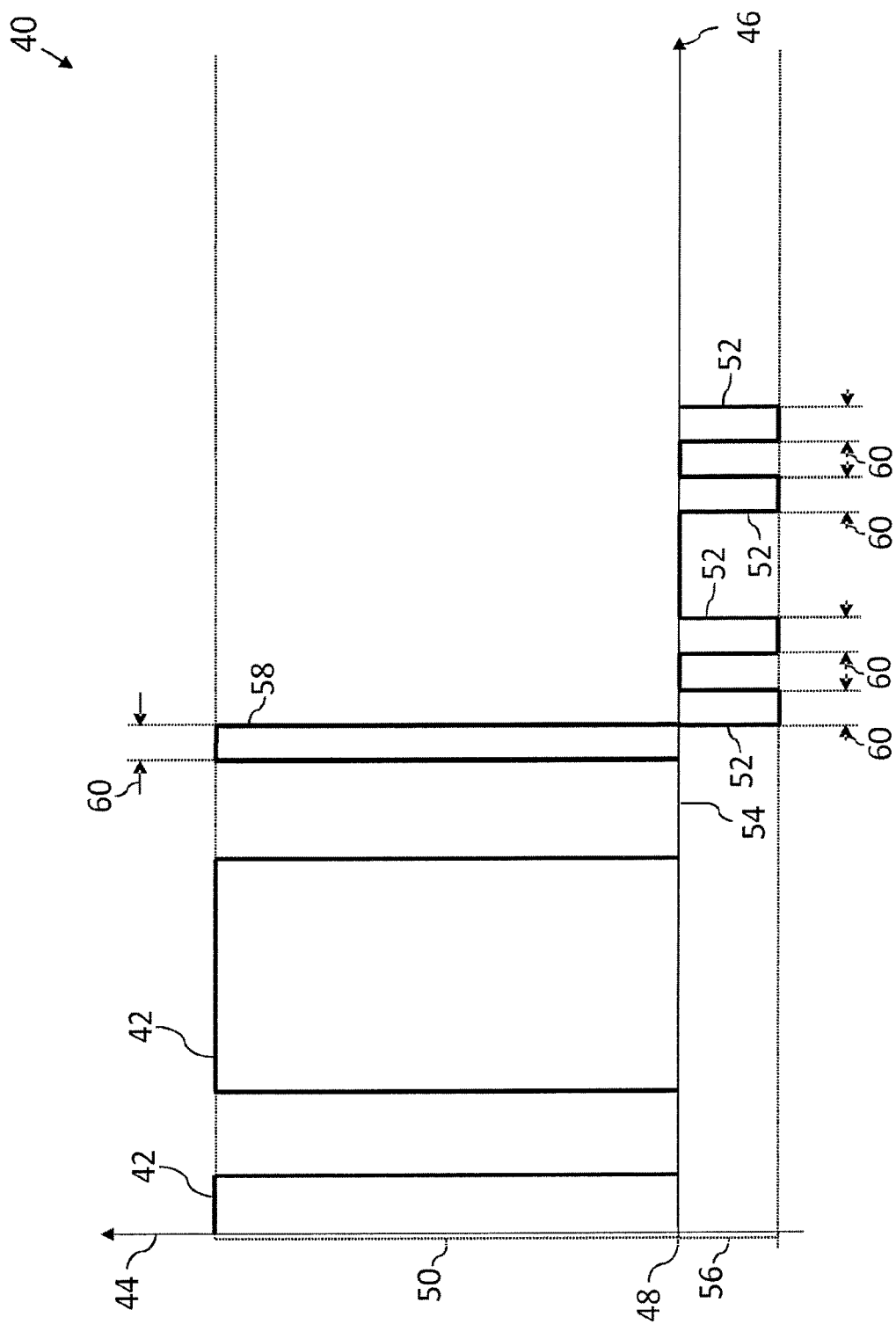

ERROR TRANSMISSION IN TWO-LEVEL ROTATIONAL SPEED SENSOR

CROSS REFERENCE TO RELATED APPLICATIONS

This application is the U.S. National Phase Application of PCT International Application No. PCT/EP2014/069007, filed Sep. 5, 2014, which claims priority to German Patent Application No. 10 2013 217 883.2, filed Sep. 6, 2013 and German Patent Application No. 10 2014 202 473.0, filed Feb. 11, 2014, the contents of such applications being incorporated by reference herein.

FIELD OF THE INVENTION

The invention relates to a method for transmitting error information in a pulse signal, to a control device for carrying out the method and to a sensor with the control device.

BACKGROUND OF THE INVENTION

DE 10 2011 080 789 A1, which is incorporated by reference, discloses a vehicle in which wheel speed sensors for detecting the wheel speed of the individual wheels are installed. These wheel speed sensors are active wheel speed sensors and transmit their measurement data in the form of wheel speeds to an evaluation device via a cable as a transmission link.

SUMMARY OF THE INVENTION

An aspect of the invention aims to improve the transmission of the measurement data.

According to one aspect of the invention a method for transmitting error information in a pulse signal which is configured to transmit measured values, which are frequency modulated with pulses having a first magnitude, from a sensor to a receiver, comprises the steps of detecting an error in the sensor, and introducing a pulse, having a second magnitude which is different from the first magnitude, into the pulse signal in order to indicate the detected error in the pulse signal.

The specified method is based on the idea of detecting faulty measured values in order to comply with high safety standards, and of correspondingly taking them into account during the processing of the latter. The detection of the faulty measured values could take place in the device which processes the measured values. However, the problem arises here that the detection is based to a certain extent on computationally intensive algorithms whose sequences take a certain amount of time.

For this reason it would be desirable to integrate the sensor which detects the measured values into the detection of the faulty measured values. However, for this purpose the information about the error would have to be transmitted by the sensor in a measured value in addition to the faulty measured value itself for this information to be able to be taken into account during the processing. The more information the sensor makes available about the error, the more quickly it is possible to react thereto during the processing, which can significantly increase the safety, in particular in the case of applications in a vehicle.

The intention to transmit an indication of the error and as much information as possible about the error is opposed in the sensor which transmits its measured values in a frequency-modulated fashion by the fact that for the receiver it is difficult to decide, on the basis of the frequency-modulated signal, which pulses carry information about the measured values and which pulses carry other information.

This is where the specified method comes in, within the scope of which it is proposed to transmit the information relating to the measured values and the information about possibly occurring errors with pulses of different magnitude. In this way, it is apparent to the receiver solely from the fact that pulses are received with a magnitude which is different from the magnitude of the pulses carrying the measured value information, that a fault is present and the receiver can correspondingly react thereto. In this way, the reliability of the measured values and therefore their integrity can be increased on the receiver side.

Beyond these pulses with the first magnitude and the second magnitude, no further pulses with other magnitudes should be transmitted.

In one development of the specified method, the measured value is input as a pulse from an active rotational speed sensor into the data transmission signal. In active rotational speed sensors, wheel speed information is known to be output in a frequency-modulated fashion with pulses from whose number it is possible to determine the rotational speed over a certain time period. An example that may be mentioned of this in this context is a vehicle movement dynamics controller for a vehicle, which controller has to react reliably, in particular in high rotational speed ranges of the wheels. Here, the method can improve the quality of the troubleshooting in a particularly favorable way.

In one development of the specified method, the pulse with the second magnitude is negative in comparison with the pulses with the first magnitude. In this way, the possibility of differentiating between the pulses with the first magnitude and the pulse with the second magnitude is significantly increased, with the result that the occurrence of an error in the pulse signal can be detected particularly clearly.

In another development of the specified method, the pulse with the second magnitude directly follows a pulse with the first magnitude, with the result that both pulses have a common edge. In this way, the pulse with the first magnitude can be used directly before the pulse with the second magnitude to indicate an error which has possibly occurred and either to categorize all the subsequent pulses with the first magnitude as invalid or initiate the start of an error description protocol with which more detailed information on the error which has occurred is described.

In order to improve further the abovementioned development of the specified method, the pulse with the second magnitude can be preceded by a pulse which has the first magnitude and a predetermined width, with the result that it can be indicated even more clearly that this pulse with the first magnitude serves to initiate the error description protocol. In this context it should be borne in mind that within the scope of this development it is not absolutely necessary for the two specified pulses to follow one another immediately.

In a particular development, the second pulse with the second magnitude and the pulse which precedes the second pulse and has the first magnitude have the same predetermined width. In this way, the receiver can be synchronized with the pulse width of the two pulses and prepare itself for the reception of a possible subsequent error description protocol.

Within the scope of this error description protocol it is possible to introduce at least one further pulse having a second magnitude which is different from the first magnitude into the pulse signal in order to describe the detected error.

The error can particularly preferably be encoded on the basis of the two pulses with the second magnitude and possibly on the basis of further subsequent pulses with the second magnitude.

In this context it is possible for further pulses with the first magnitude to be introduced into the pulse signal between the pulses with the second magnitude which carry the error description protocol. This is advantageous, in particular, if the detected error is not safety-critical, with the result that although the receiver has to detect the error, the corresponding measurement data can continue to be transmitted with restrictions. In this case, the error description protocol can be transmitted virtually simultaneously with the measurement data without the transmission of measurement data having to be interrupted.

In one particular development of the specified method, the pulses with the second magnitude have the same width, with the result that they can easily be decoded on the receiver side.

According to a further aspect of the invention, a control device is configured to carry out one of the specified methods.

In one development of the specified control device, the specified device has a memory and a processor. In this context, one of the specified methods is stored in the form of a computer program in the memory, and the processor is provided for executing the method when the computer program is loaded into the processor from the memory.

According to a further aspect of the invention, a computer program comprises program code means for carrying out all the steps of one of the specified methods when the computer program is executed on a computer or on one of the specified devices.

According to a further aspect of the invention, a computer program product contains a program code which is stored on a computer-readable data carrier and which carries out one of the specified methods when it is executed on a data-processing device.

According to a further aspect of the invention, a sensor comprises one of the specified control devices.

In a particular development, the specified sensor is a wheel speed sensor.

According to a further aspect of the invention, a vehicle comprises one of the specified wheel speed sensors.

BRIEF DESCRIPTION OF THE DRAWINGS

The properties, features and advantages of this invention which are described above as well as the way in which they are achieved become clearer and more clearly comprehensible in conjunction with the following description of the exemplary embodiments which are explained in more detail in conjunction with the drawings, in which:

FIG. 3 shows a diagram with an output signal from the wheel speed sensor in FIG. 2, and FIG. 4 shows a further diagram with an output signal from the wheel speed sensor in FIG. 2.

DETAILD DESCRIPTION OF THE PREFERRED EMBODIMENTS

In the figures, identical technical elements are provided with identical reference symbols and are described only once.

Figure 1:
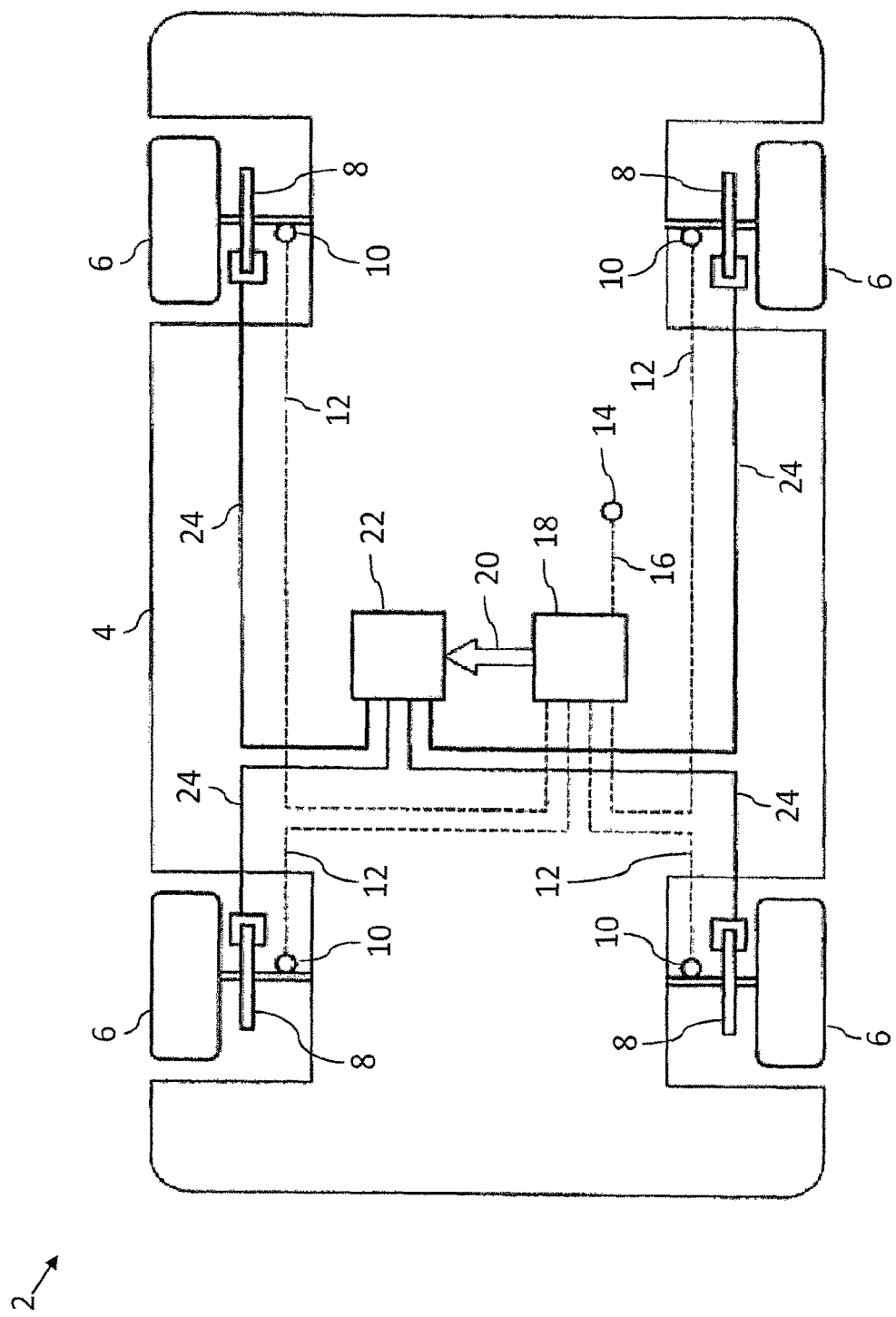
FIG. 1 shows a schematic view of a vehicle with a vehicle movement dynamics controller.

Reference is made to FIG. 1 which shows a schematic view of a vehicle 2 with a vehicle movement dynamics controller which is known per se. Details on this vehicle movement dynamics controller can be found, for example, in DE 10 2011 080 789 A1.

The vehicle 2 comprises a chassis 4 and four wheels 6. Each wheel 6 can be slowed down with respect to the chassis 4 by means of a brake 8 which is attached in a positionally fixed fashion to the chassis 4, in order to slow down the movement of the vehicle 2 on a road (not illustrated in more detail).

In this context, the wheels 6 of the vehicle 2 can, in a way which is known to a person skilled in the art, lose their grip and the vehicle 2 can even move away from a trajectory, predefined, for example, by means of a steering wheel which is not shown in more detail, as a result of understeering or oversteering. This is avoided by closed-loop control circuits which are known per se, such as ABS (anti-lock brake system) and ESP (electronic stability program).

In the present embodiment, the vehicle 2 has for this purpose rotational speed sensors 10 on the wheels 6, which rotational speed sensors 10 detect a rotational speed 12 of the wheels 6. In addition, the vehicle 10 has an inertial sensor 14 which detects movement dynamics data 16 of the vehicle 2, said data being able to comprise, for example, a pitch rate, a rolling rate, a yaw rate, a lateral acceleration, a longitudinal acceleration and/or a vertical acceleration in a way which is known per se to a person skilled in the art.

Based on the detected rotational speeds 12 and movement dynamics data 16, an evaluation device in the form of a controller 18 can determine, in a way known to a person skilled in the art, whether the vehicle 2 is slipping on the roadway or is even deviating from the above-mentioned predefined trajectory, and can correspondingly react thereto with a controller output signal 20 which is known per se. The controller output signal 20 can then be used by an actuating device 22 to actuate, by means of actuation signals 24, actuation elements, such as the brakes 8, which react to the slipping and to the deviation from the predefined trajectory in a manner known per se.

On the basis of one of the rotational speed sensors 10 shown in FIG. 1, the present invention will now be explained in more detail, even if the present invention can be implemented on any sensors, such as, for example, the inertial sensor 14.

Figure 2:
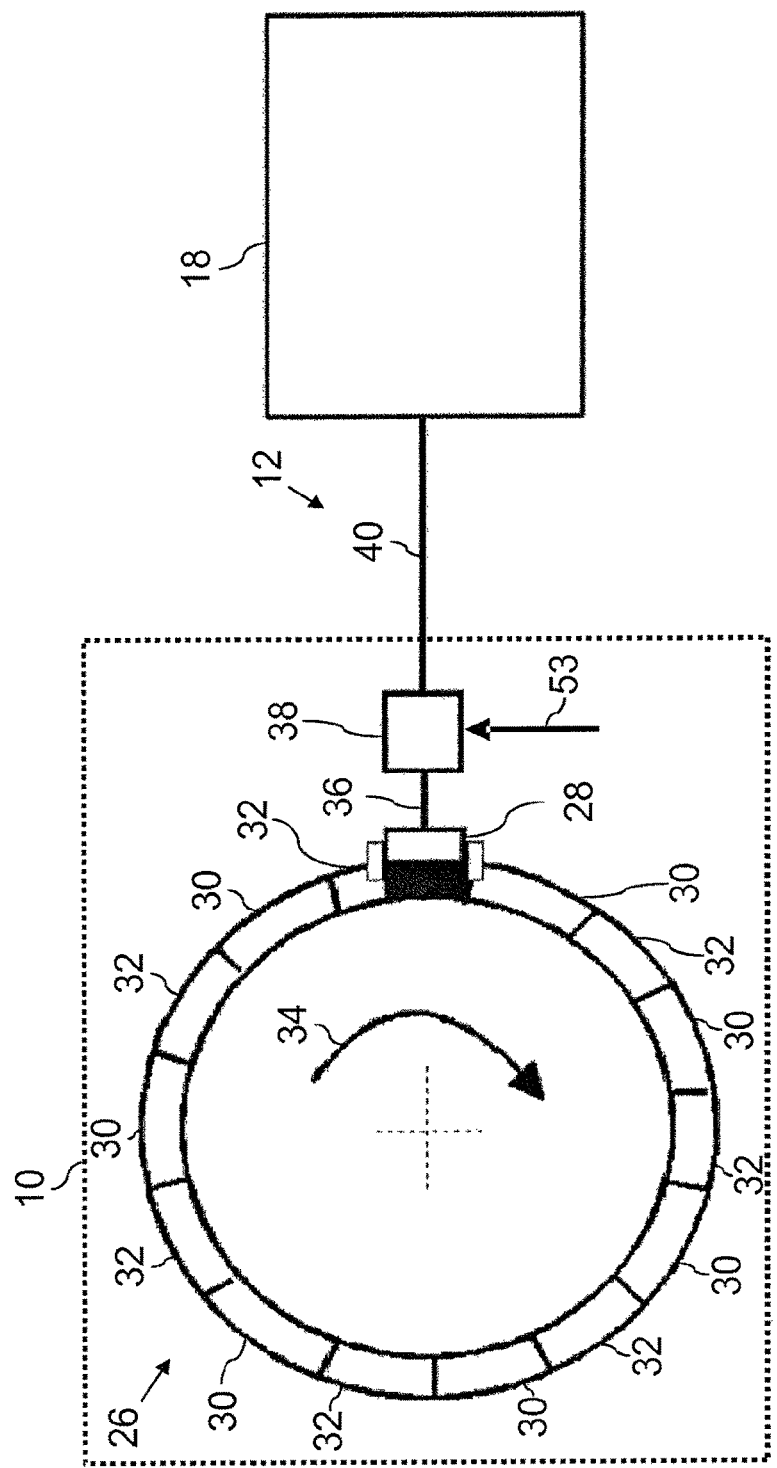
FIG. 2 shows a schematic view of a wheel speed sensor in the vehicle in FIG. 1.

Reference is made to FIG. 2 which shows a schematic view of one of the rotational speed sensors 10 in the vehicle movement dynamics controller in FIG. 1.

The rotational speed sensor 10 is embodied in the present embodiment as an active rotational speed sensor which comprises an encoder disk 26 which is attached in a rotationally fixed fashion to the wheel 6, and a reading head 28 which is attached in a positionally fixed fashion to the chassis 4.

The encoder disk 26 is composed, in the present embodiment, of adjacent magnetic North poles 30 and magnetic South poles 32 which together excite an encoder magnetic field (not illustrated further). If the encoder disk 26 which is attached to the wheel 6 rotates with the latter in a rotational direction 34, the encoder magnetic field rotates correspondingly in synchronism therewith.

In the present embodiment, the reading head 28 is a magnetostrictive element which changes its electrical resistance as a function of the angular position of the encoder magnetic field which is excited by the encoder wheel 26.

In order to detect the rotational speed 12, the change in the angular position of the encoder wheel 26 and therefore the change in the electrical resistance of the reading head 28 is detected. For this purpose, the reading head 28 can be connected in a manner known per se to a resistance measuring circuit (not illustrated further) such as, for example, a bridge circuit which is known per se. Depending on the electrical resistance of the reading head 28, a periodic output signal, referred to below as rotational speed encoder signal 36, is generated in the resistance measuring circuit. On the basis of the rotational speed encoder signal 36, a pulse signal 40, which is dependent on the rotational speed 12 and is shown in FIG. 3, is generated in a manner known per se in a signal conditioning circuit 38 which is arranged downstream of the reading head 28, and said pulse signal 40 is output to the controller 18. In this respect, and for further background information on active wheel rotational speed sensors, reference is made to the relevant prior art such as, for example, DE 101 46 949 A1, which is incorporated by reference.

The pulse signal 40 has the rotational speed 12 in a frequency-modulated fashion in first pulses referred to below as measuring pulses 42, which are plotted in FIG. 3 in a signal 44—time 46—diagram. The frequency modulation per se is already given by the measuring method in the abovementioned rotational speed sensor 10, wherein the measuring pulses 42 can be generated in the signal conditioning circuit 38.

The measuring pulses 42 have a predetermined first magnitude 50 starting from a specific reference signal value 48. Within the scope of the frequency modulation, the number of measuring pulses 42 is determined over time 46 according to the measured value to be transmitted for the rotational speed 12, that is to say that the number of measuring pulses 42 increases as the rotational speed 12 rises. Therefore, in FIG. 3 the pulse signal 40 is shown in a state in which the rotational speed 12 drops over time 44, and the number of measuring pulses 42 decreases over a specific time period.

The transmission of measuring pulses 42 in active rotational speed sensors, like the rotational speed sensor 10 described above, is known in detail and will therefore not be explained further.

In the present embodiment, second pulses, also referred to as error pulses 52 below, are input into the pulse signal 40 in addition to the measuring pulses 42 which describe the rotational speed 12, the occurrence of an error 53 being apparent from said second pulses starting from an error time 54. The error 53 can be made available to the signal conditioning circuit 38, for example, via a monitoring circuit (not shown further). Within the scope of the present embodiment, the error pulses 52 have a second magnitude 56 which, starting from the reference signal value 48, run in the negative direction compared to the measuring pulses 42.

For the receiver 18, it is therefore immediately apparent that the error 53 is present solely as a result of the occurrence of the error pulse 52, wherein the error time 54 itself can also be estimated.

In order to additionally permit the receiver 18 to evaluate the error, error information can also be transmitted and this will be described below with reference to FIG. 4.

In FIG. 4, after the occurrence of the error 53 at the error time 54, a synchronization pulse 58, which has the same magnitude 50 as the measuring pulses 42, is transmitted. A chronological width 60 of the synchronization pulse 58 is precisely of the same magnitude here as the chronological width 60 of the error pulses 52. In this way, the receiver 18 can synchronize itself with the error pulses 52, with the result that it can correspondingly decode them.

The information about the error 53 at the error time 54 and further information can be transmitted in encoded fashion with the error pulses 52. Each error pulse 52 has a bit here. If, for example, eight bits #0 to #8 are transmitted, eight error pulses 52 are correspondingly required. Each error pulse 52 which is transmitted with the second magnitude 56 has the information 1 for its corresponding bit #0 to #8. Each error pulse 52 which is transmitted with the reference value 48 has the information 0 for its corresponding bit #0 to #8.

If the error 53 is detected in the rotational speed sensor 10 at the error time 54, the bit #0="1" can be set and therefore the first error pulse 52 can be transmitted with the second magnitude 56. The bit sequence from the remaining defineable bits #1, #2, #5, #6 and #7, that is to say the remaining error pulses 52, can then be used for an unambiguous breakdown of general error information into $2^5=32$ error causes.

The technical subject matters of FIG. 3 and FIG. 4 can be combined with one another here in a suitable way.

The invention claimed is:

1. A method for introducing error information in a pulse signal generated by a reading head of a rotational rate sensor, the method comprising:
    sensing, by the reading head of the rotational rate sensor, rotational movement of an encoder of the rotational rate sensor;
    producing, by the reading head of the rotational rate sensor, measured values representing the rotational movement of the encoder;
    detecting, by the rotational rate sensor, an error in the sensed rotational movement of the encoder;
    producing, by a signal conditioning circuit of the rotational rate sensor, the pulse signal based on the measured values and pulses having a first magnitude; and
    introducing, by the signal conditioning circuit of the rotational rate sensor, an error pulse into the pulse signal in order to indicate the detected error in the sensed rotational movement of the encoder, the error pulse having a second magnitude which is different from the first magnitude,
    wherein the error pulse with the second magnitude directly follows a pulse with the first magnitude, such that the pulse of the first magnitude and the error pulse share a common edge.

2. The method as claimed in claim 1, wherein the error pulse with the second magnitude is negative in comparison with the pulses with the first magnitude.

3. The method as claimed in claim 1, wherein the error pulse with the second magnitude is preceded by the pulse with the first magnitude, the pulse of the first magnitude having a predetermined width.

4. The method as claimed in claim 3, wherein the error pulse with the second magnitude and the pulse which precedes the error pulse with the second magnitude have the same predetermined width.

5. The method as claimed in claim 1, further comprising introducing at least one further pulse having the second magnitude which is different from the first magnitude into the pulse signal in order to describe the detected error.

6. The method as claimed in claim 5, wherein the pulses with the second magnitude have a same width.

7. The method as claimed in claim 1, further comprising encoding the error on the basis of the error pulse with the second magnitude.

8. The method as claimed in claim 7, wherein the error pulse with the second magnitude and another error pulse introduced into the pulse signal have a same width and indicate the detected error.

9. A rotational rate sensor comprising:
an encoder;
a reading head circuit configured to:
   sense rotational movement of the encoder;
   produce measured values representing the rotational movement; and
a signal conditioning circuit configured to:
   detect an error in the sensed rotational movement of the encoder;
   produce a pulse signal based on the measured values and pulses having a first magnitude; and
   introduce an error pulse into the pulse signal in order to indicate the detected error in the pulse signal, the error pulse having a second magnitude which is different from the first magnitude,
   wherein the error pulse with the second magnitude directly follows a pulse with the first magnitude, such that the pulse of the first magnitude and the error pulse share a common edge.

* * * * *